(12) United States Patent
Farkash

(10) Patent No.: US 6,406,045 B1
(45) Date of Patent: Jun. 18, 2002

(54) RUNNING BOARD STORAGE COMPARTMENT FOR A WHEELED LAND VEHICLE WHICH INCLUDES AN EJECTABLE DRAWER

(76) Inventor: Daniel G. Farkash, 28442 Driver Ave., Agoura Hills, CA (US) 91301

( * ) Notice: Subject to any disclaimer, the term of this patent is extended or adjusted under 35 U.S.C. 154(b) by 3 days.

(21) Appl. No.: 09/802,720

(22) Filed: Mar. 12, 2001

Related U.S. Application Data

(63) Continuation-in-part of application No. 09/748,459, filed on Dec. 27, 2000.

(51) Int. Cl.7 .................................................. B60R 3/00
(52) U.S. Cl. .................... 280/164.1; 280/769; 296/37.6
(58) Field of Search .............................. 280/164.1, 163, 280/165, 166, 769; 296/37.6, 37.1; 182/127; 312/332.1, 333, 311

(56) References Cited

U.S. PATENT DOCUMENTS

| | | | |
|---|---|---|---|
| 1,433,810 A | 10/1922 | Gibbons | |
| 1,451,202 A | 4/1923 | Brown | |
| 1,453,362 A | 5/1923 | Loveland | |
| 1,488,720 A | 4/1924 | Tichey et al. | |
| 1,726,398 A | 8/1929 | Limbocker | |
| 1,822,480 A | 9/1931 | Edelmann et al. | |
| 2,598,814 A | 6/1952 | McAfee | |
| 2,981,554 A | 4/1961 | Mulder et al. | |
| 3,466,105 A | * 9/1969 | Guth | 312/274 |
| 3,466,108 A | * 9/1969 | Guth | 312/274 |
| 3,764,048 A | 10/1973 | Core | |
| 4,570,986 A | 2/1986 | Sams | |
| 4,674,782 A | 6/1987 | Helber | |
| 4,696,507 A | 9/1987 | Allredge | |
| 4,948,169 A | 8/1990 | Amundson | |
| 5,458,353 A | 10/1995 | Hanemaayer | |
| 5,518,158 A | 5/1996 | Matlock | |
| 6,129,401 A | 10/2000 | Neag et al. | |

* cited by examiner

Primary Examiner—J. J. Swann
Assistant Examiner—James S. McClellan
(74) Attorney, Agent, or Firm—Jack C. Munro

(57) ABSTRACT

A running board storage device mounted in conjunction with a land vehicle where the running board storage device can be used as a step to facilitate entry and exit through an access door of the vehicle. The storage device comprises a drawer mounted within a housing which is slidingly movable between a retracted position where access into the drawer is prevented and an extended position where access into the drawer is permitted. A door is pivotally mounted on the housing with this door cooperating with the drawer, when in the retracted position, to close the internal compartment of the housing. The door can be pivoted to an open position permitting access into the internal compartment of the drawer and movement of the drawer to the extended position. A roller is mounted on the door which engages with a guide track mounted on the drawer. As the door is opened, the drawer is initially ejected toward the extended position.

19 Claims, 7 Drawing Sheets

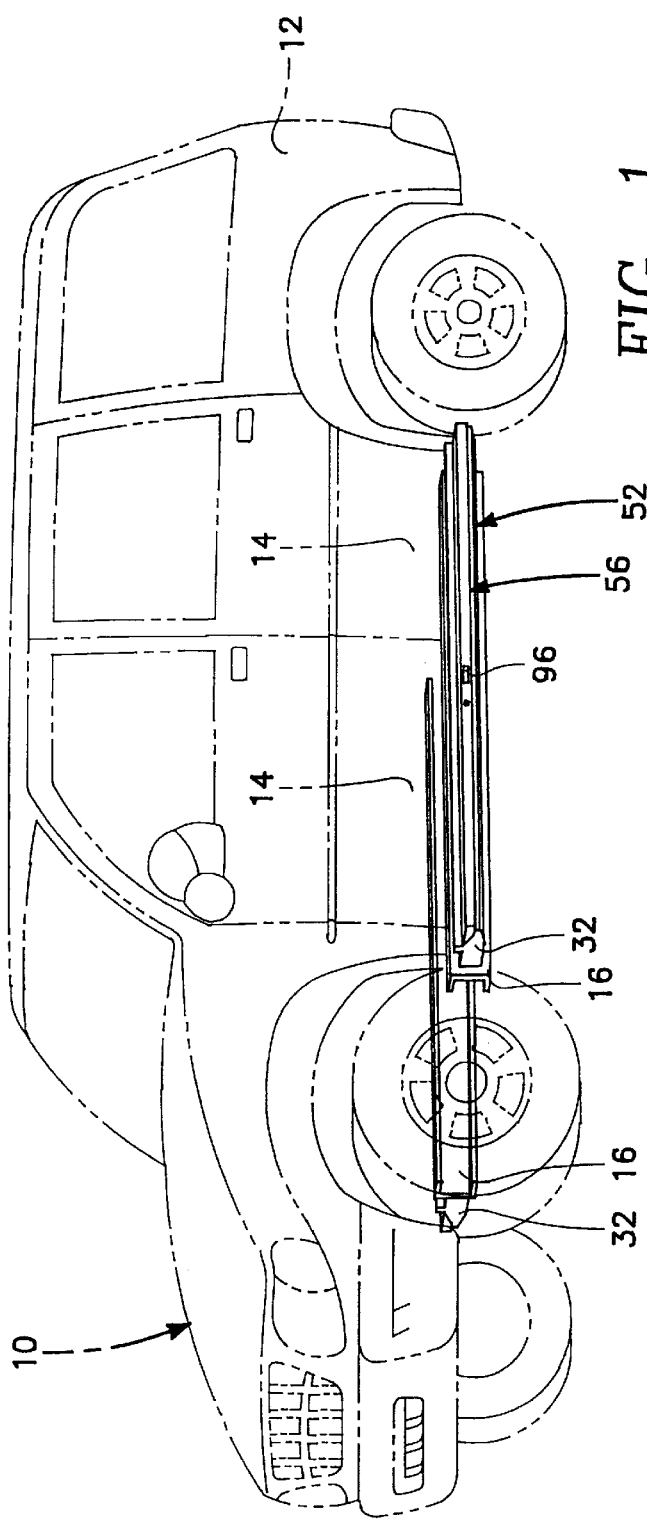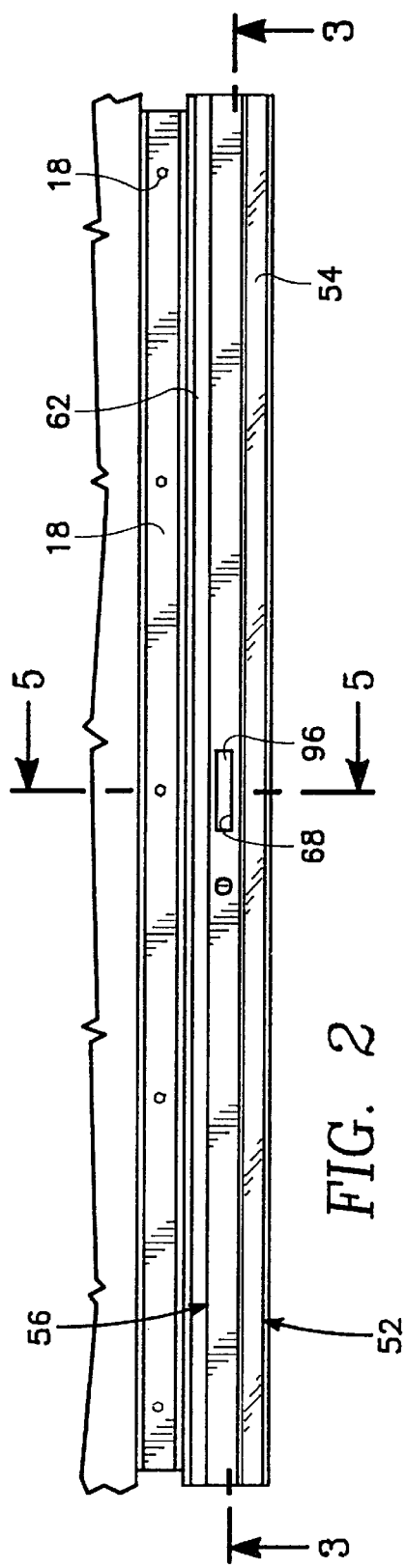

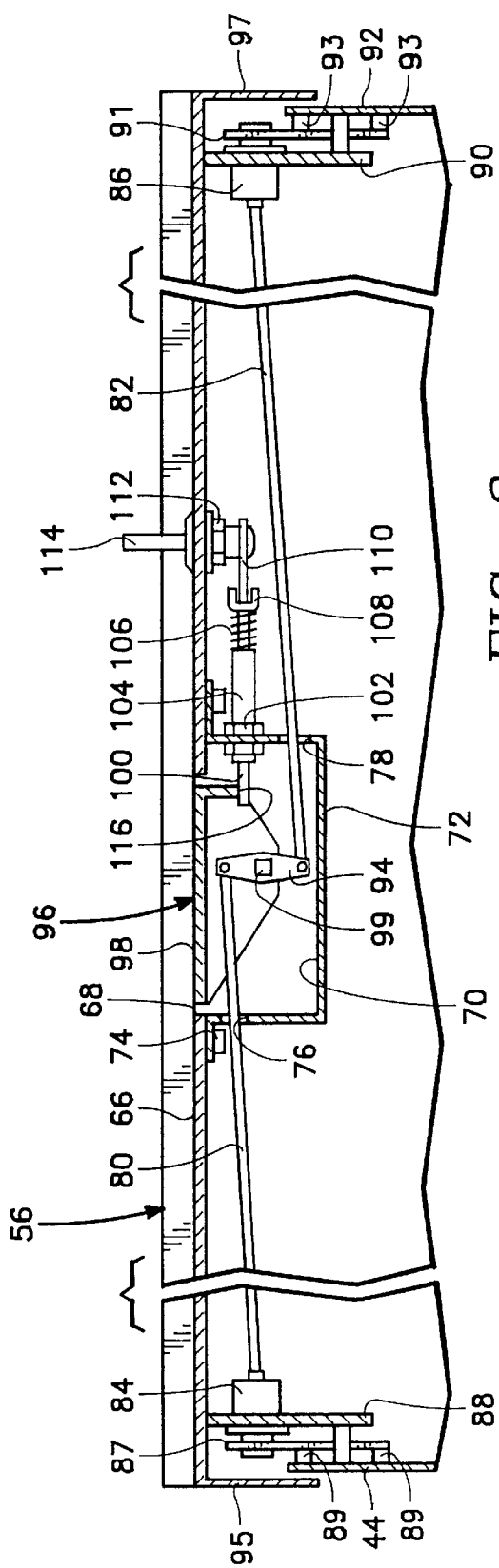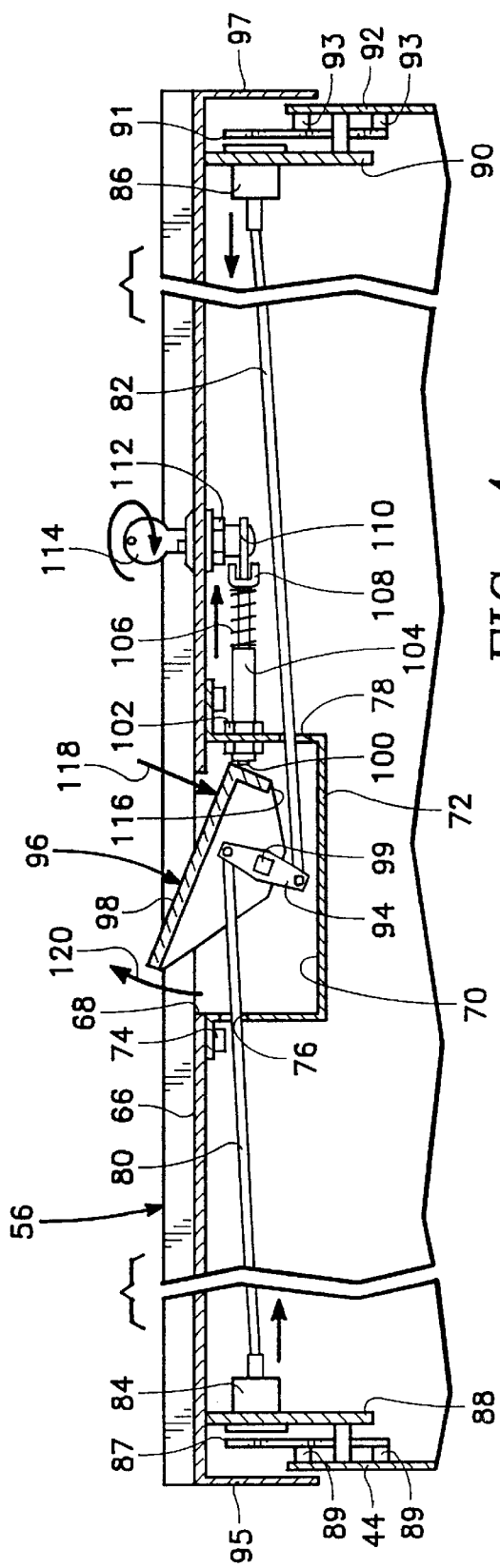
FIG. 3
FIG. 4

RUNNING BOARD STORAGE COMPARTMENT FOR A WHEELED LAND VEHICLE WHICH INCLUDES AN EJECTABLE DRAWER

REFERENCE TO PRIOR APPLICATION

This application is a continuation-in-part of U.S. patent application Ser. No. 09/748,459, filed Dec. 27, 2000, by the same title and the same inventor.

BACKGROUND OF THE INVENTION

1. Field of the Invention

The field of this invention relates to storage devices and more particularly to a storage device that is included within a running board of a land vehicle.

2. Description of the Related Art

Personal land vehicles can be characterized as automobiles, pickup trucks, sport utility vehicles and recreational vehicles. Automobiles, at the present time, do not include a running board. A running board generally constitutes no more than a step that is located just below the access door(s) on each side of the land vehicle which can be utilized by a human when entering and exiting the land vehicle which provides for an immediate location for a user to place one's feet prior to entering the land vehicle after stepping off the ground and when exiting the land vehicle prior to stepping onto the ground. Most pickup trucks, sport utility vehicles and recreational vehicles are raised some distance off the ground. Therefore, for a human to enter or exit such land vehicle requires an initial step of a distance of approximately eighteen inches. This is a significant large step for most people, and it is for this reason most people that running boards are utilized to break up that eighteen distance to be no greater than about twelve inches.

In connection with pickup trucks and sport utility vehicles, it is desirable to include as much storage space as possible. Storage space is always desirable for the storing of tools in connection with one's job, or elongated members such as commonly used in conjunction with certain sports, such as skis for skiing. Normally, a running board is designed to be constructed of metal, fiberglass or plastic and function as only a step. However, in the past, it has been known to incorporate some type of a storage container in conjunction with a running board thereby obtaining of additional storage in conjunction with the land vehicle that heretofore was not possible. However, in the past, such storage container running boards have not been attractively designed nor constructed in a manner that facilitates maximum use of the storage ability. Also, such prior art storage devices have been designed to be rather complex by altering the chassis itself of the land vehicle which inherently increases the cost of manufacture and thereby makes a running board storage device relatively expensive.

The including of a storage container in conjunction with a running board locates the storage container at a low level near to the ground. This then requires the user to bend over or kneel in order to gain access into the storage container. Some individuals, especially older people, find it not comfortable to bend over and kneel. To minimize the amount of bending by a user, it has been known to incorporate a drawer in conjunction with the running board storage container. The drawer provides the advantage of being movable to an extended position which provides direct above access to the stored articles contained within the drawer since the drawer can be moved to an extended position protruding from the storage compartment of the running board. However, in the past, such drawers have not been connected to the door that is to be opened in the running board.

SUMMARY OF THE INVENTION

Within the primary embodiment of this invention, there is defined a land vehicle which has a front set of wheels and a rear set of wheels and an access door mounted within the body of the land vehicle between the sets of wheels. A running board is mounted on the body and also located between the sets of wheels and beneath the access door. The running board has a housing which is fixed to the body of the vehicle. A drawer, which has an inside compartment adapted to store articles, is movably mounted on the housing between a retracted position and an extended position. A door is mounted on the housing with the door being movable between an open position and a closed position. The door connects with the drawer when the drawer is in the retracted position and when the door is in the closed position to enclose the inside compartment. In the closed position, the door functions as a step for a human when entering and exiting the body of the vehicle. An arm is mounted on the door with the free end of the arm including a slider. This slider is engaged with a track mounted on the drawer.

A further embodiment of this invention utilizes a locking device mounted on the door with the locking device to engage with the housing to prevent the drawer moving to the extended position when the door is in the closed position and the drawer is in the retracted position preventing unauthorized entry into the inside compartment.

A further embodiment of this invention comprises the door being hingedly movable between the open and the closed position.

A still further embodiment of this invention is when the drawer is slidably movable between the retracted position and the extended position.

A still further embodiment of this invention is that the housing includes a flange which connects with the door to prevent seeping of water into the article storage compartment.

A still further embodiment of this invention is that when the door is in the closed position and the drawer is in the retracted position, the front face of the door and the front face of the drawer cooperate to form the entire front face of the running board.

A still further embodiment of this invention is where the slider comprises a roller which is low frictionally movably attached to the arm.

A still further embodiment of this invention is where the guide track has a horizontal section and a vertical section with the vertical section being aligned with the height of the drawer.

The primary objective of the present invention is to construct a running board for a land vehicle where the running board includes an interior compartment within which is mounted a drawer thereby utilizing previously unused space for storage of articles.

Another objective of the present invention is to construct a running board storage device where a drawer is included within the storage device facilitating the storage of smaller size articles.

Another objective of the present invention is to construct a running board storage device which can be securely locked preventing unauthorized access into the storage compartment.

Another objective of the present invention is to construct a running board storage device which could be constructed of a lightweight metal, fiberglass or plastic.

Another objective of the present invention is to construct a running board storage device to be mounted in a position partially under the body of the land vehicle thereby utilizing normally unused space in conjunction with the land vehicle.

Another objective of the present invention is to construct a running board storage device which can be installed as an after market accessory which can be easily bolted to the body of the land vehicle not requiring exterior body alteration or repair of the land vehicle.

Another objective of the present invention is to allow for easy entry and exit from the passenger compartment of a truck by a human when entering from the side of the truck.

Another objective of the present invention is where the drawer is connected to the door and movement of the door to the open position automatically causes partial extension of the drawer.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 1 is an isometric view of a pair of running board storage devices of the present invention being mounted in conjunction with a typical land vehicle shown in phantom;

FIG. 2 is a front view of the running board storage device of this invention showing the running board storage device in the closed position which is the position where the running board storage device can be used as a step;

FIG. 3 is a longitudinal cross-sectional view through the running board storage device of this invention taken along line 3—3 of FIG. 2 showing the running board storage device in the closed and locked position;

FIG. 4 is a view similar to FIG. 3 but showing the locking mechanism in the unlocked position with the storage device still being maintained in the closed position;

DETAILED DESCRIPTION OF THE PREFERRED EMBODIMENT

Figure 5:
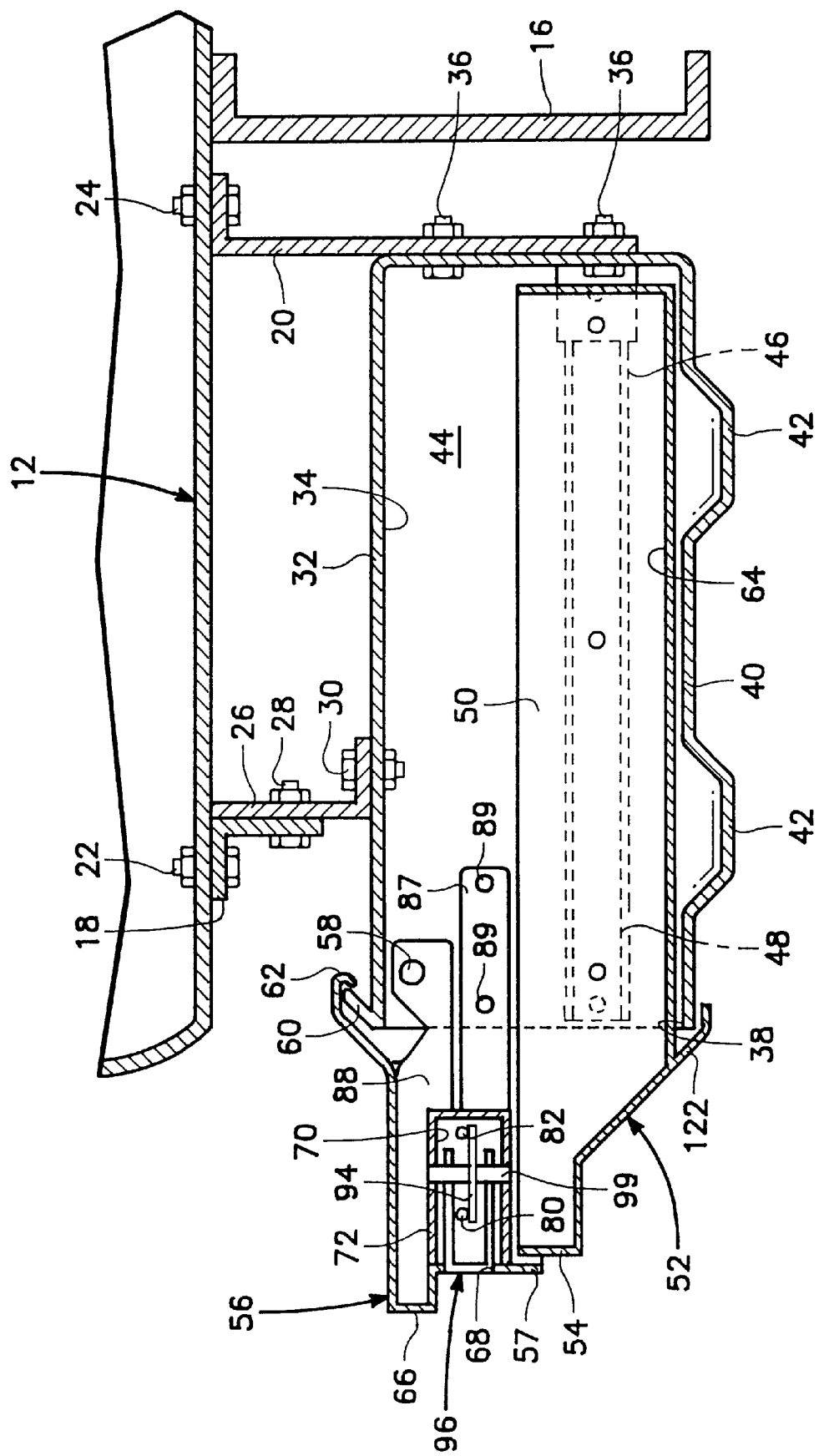
FIG. 5 is a transverse cross-sectional view through the running board storage device of the present invention taken along line 5—5 of FIG. 2 showing the running board storage device in the closed position.

Referring particularly to the drawings, there is shown in phantom lines in FIG. 1 a typical land vehicle 10. The land vehicle 10 has an enclosing body or chassis 12. Normally, the body 12 will be constructed of sheet material. Included within the body 12 are a plurality of access doors 14. The body 12 is mounted on a frame 16.

Mounted on the body 12 is a front mounting bracket 18 and a rear mounting bracket 20. The front mounting bracket 18 is fixedly mounted by a plurality of bolts 22 to the body 12. In a similar manner, the rear mounting bracket 20 is fixedly mounted by a plurality of bolts 24 to the body 12. The brackets 18 and 20 can each comprise a single elongated member or could comprise a plurality of separate members located in a spaced apart manner.

An L-shaped bracket 26 is fixedly mounted by a series of bolts 28 to the front mounting bracket 18. The L-shaped bracket or brackets 26 is then secured by bolts 30 to the running board storage compartment housing 32. The storage compartment housing 32 is basically rectangular in configuration and generally will be several feet in length and will include an interior compartment 34. The compartment 34 will normally be between four to six inches in height and about twelve to fourteen inches deep. The housing 32 is fixedly secured by bolts 36 to the rear mounting bracket 20. The housing 32 is basically channel shaped forming a completely enclosed five sided container with the front side being open defining an access opening 38. The bottom side 40 of the housing 32 includes longitudinal strengthening ribs 42.

Figure 6:
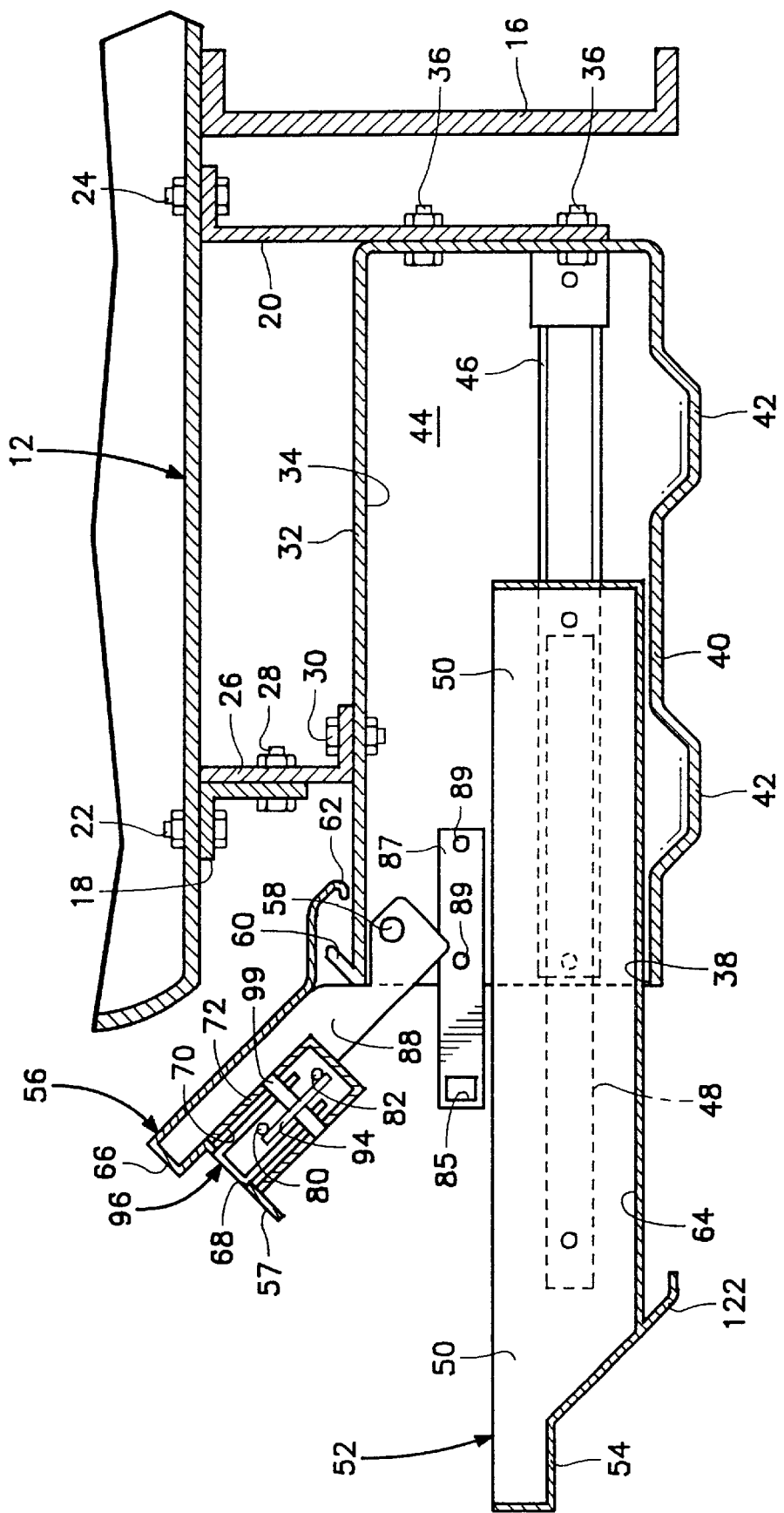
FIG. 6 is a transverse cross-sectional view similar to FIG. 5 but with the door of the running board storage device in the open position and the drawer that is contained within the running board storage device in the extended position.

Mounted on the sidewalls of the housing 32, with only the sidewall 44 being shown, are drawer glide rails 46. These drawer glide rails 46 are to be used to slidingly engage with drawer glides 48 which are mounted on the sidewalls 50 of a drawer 52. It is to be understood that there is only a single drawer glide 48 mounted on a single sidewall 50 so there will be two in number of the drawer glides 48 mounted on each of the sidewalls 50 with there being two such sidewalls 50. Movement of the drawer 52 from the retracted position shown in FIG. 5 totally confined within the interior compartment 34 to the extended position shown in FIG. 6 is by having the drawer glides 48 to slidingly move relative to the drawer guide rails 46. It is to be understood that there is a separate drawer guide rail 46 for each drawer glide 48. The drawer 52 has a front face 54.

Pivotally mounted to the housing 32 is a door 56. The door 56 is pivotally mounted by means of a pivot pin 58 which connects with the sidewall 44. It is to be understood that the opposite side of the door 56, which runs the entire length of the housing 32, will be similarly pivotally mounted to sidewall 90 by a pivot pin, which is not shown. The housing 32 includes an elongated flange 60 with this flange 60 also extending the entire length of the housing 32. The purpose of the flange 60 is to prevent seepage of any rainwater or any other type of water into the interior compartment 34. The door 56 includes a curved flap 62. This curved flap 62 will cover the flange 60 when the door 56 is in the closed position, which is shown in FIG. 5. When the door 56 is pivoted to an open position which locates the door 56 closer to the body 12, which is shown in FIG. 6, the flap 62 merely pivots away from the flange 60 but still functions to cover the flange 60. Therefore, even in a situation where it was raining and the door 56 was moved to the open position shown in FIG. 6, the flap 62 in connection with the flange 60 will prevent the entry of water from above the housing 32 into the interior compartment 34. Door 56 also includes a downwardly projecting flange 57.

The drawer 52 includes an inside compartment 64. Articles, such as fishing equipment, first aid kits, jumper cables, motor fluids, snow chains, emergency tools and water plus numerous other types of articles, could be readily stored within the inside compartment 64. For hunters and military personnel, guns and ammunition could be stored within the inside compartment 64. The potential use of the inside compartment 64 is limitless to all users and is to function not only to keep day-to-day articles safe and dry but also keep valuables safe and dry and out of view.

The door 56 has a step shaped front face 66 which includes flange 57. Formed within the front face 66 is a hole 68. The hole 68 connects with a cavity 70 of a box 72. The box 72 is fixedly mounted to the interior wall of the front face 66 by means of bolts 74. The box 72, at one end thereof, includes a hole 76. The box 72, at an opposite end thereof, includes a hole 78. Extending through the hole 76 is a rod 80. Extending through the hole 78 is a rod 82. The outer end of the rod 80 is mounted within a cap 84. The outer end of the rod 82 is mounted within a cap 86. Cap 84 is fixedly mounted onto sidewall 88 of door 56. Cap 86 is fixedly mounted onto sidewall 90 of door 56. The outer end of the rod 80 is capable of slidingly moving through the cap 84 and engage within a hole 85 which is formed within a plate 87. Plate 87 is fixed to sidewall 44 by bolts 89. The rod 82 is slidingly movable through the cap 86 and is to be engagable in a hole (not shown) formed in a plate 91. Plate 91 is similar to plate 87. Plate 91 is fixedly mounted by bolts 93 to sidewall 92. It is to be understood that when the rods 80 and 82 engage with the holes (such as hole 85) formed within the plates 87 and 91 that the door 56 is in the closed position, the drawer 52 is in the retracted position. Downwardly depending flange 57 is located close to front face 54 blocking movement of drawer 52 to the extended position. Front face 66 includes side flanges 95 and 97 which cover the plates 87 and 91 respectively preventing entry of foreign material to plates 87 and 91.

The inner end of the rod 80 is pivotally connected to a link 94. The inner end of the rod 82 is pivotally connected also to the link 94. The link 94 is fixedly connected to a handle 96 by a square pin 99. The ends of the square pin 99 are rounded so as to permit pivoting of handle 96 relative to box 72 since these rounded ends are mounted to box 72. The handle 96 has an exterior planar surface 98. This surface 98 is to be alignable with the front face 66 when the handle 96 is in its normal at-rest position. This is also the position of when the handle 96 is locked with this locking occurring by pin 100 preventing any pivoting motion of the handle 96. However, the pin 100 is slidably mounted through a hole, which is not shown, formed within the wall of the box 72 that also contains the hole 78. The pin 100 is mounted onto the box 72 by means of a pair of nuts 102. The pin 100 passes through a sleeve 104 which is fixedly connected to the exterior nut 102. Surrounding the pin 100 is a coil spring 106 with one end of this coil spring 106 abutting against the sleeve 104. The opposite end of the coil spring 106 is to abut against U-shaped member 108. The U-shaped member 108 is to be contactable by a link 110. The link 110 is connected to a key operated locking mechanism 112. The key operated locking mechanism 112 is fixedly mounted within the wall of the front face 66. The key operated locking mechanism 112 is to be connectable and manually operated by means of a conventional key 114.

Let it be assumed that the structure of this invention is in a position shown in FIG. 5 of the drawings. Let it also be assumed that the locking mechanism is in the position shown in FIG. 3 of the drawings. Movement of the door 56 to the open position is prevented by the engagement of the rods 80 and 82 with sidewalls 45 and 92 respectively. Movement of the handle 96 is prevented by means of pin 100 being located underneath flange 116 which is part of the handle 96.

The user will insert key 114 in conjunction with the locking mechanism 112 and pivot the key 114 ninety degrees. This will cause the link 110 to be moved with the coil spring 106 exerting a biasing force against the U-shaped member 108 which will result in pin 100 being moved a spaced distance from the flange 116. This will now permit the manual pressure to be applied in the direction of arrow 118 which will cause the handle 96 to pivot as indicated by arrow 120. This will result in the rods 80 and 82 being disconnected from their respective sidewalls 50 and 92. Movement of the door 56 to the open position is now permitted. Once the door 56 is in the open position, which is shown in FIG. 6 of the drawings, the user can manually grasp the drawer 52 and manually move such to the extended position from the retracted position. The extended position is also shown in FIG. 6. The user now has free access to within the inside compartment 64 of the drawer 42. Reversing of these steps will again result in locking of the door 56 to the drawer 52.

It is to be understood that although there may be utilized only a single drawer 52 within the interior compartment 34, it is considered to be within the scope of this invention that there actually could be a plurality of such drawers 52 located in a side-by-side arrangement. The drawer 52 will normally include a depending flange 122 which overlaps the front edge of the bottom side 40 in order to prevent the entry of any water that may splash up from the underside of the land vehicle 10 to within the interior compartment 34.

Figure 7:
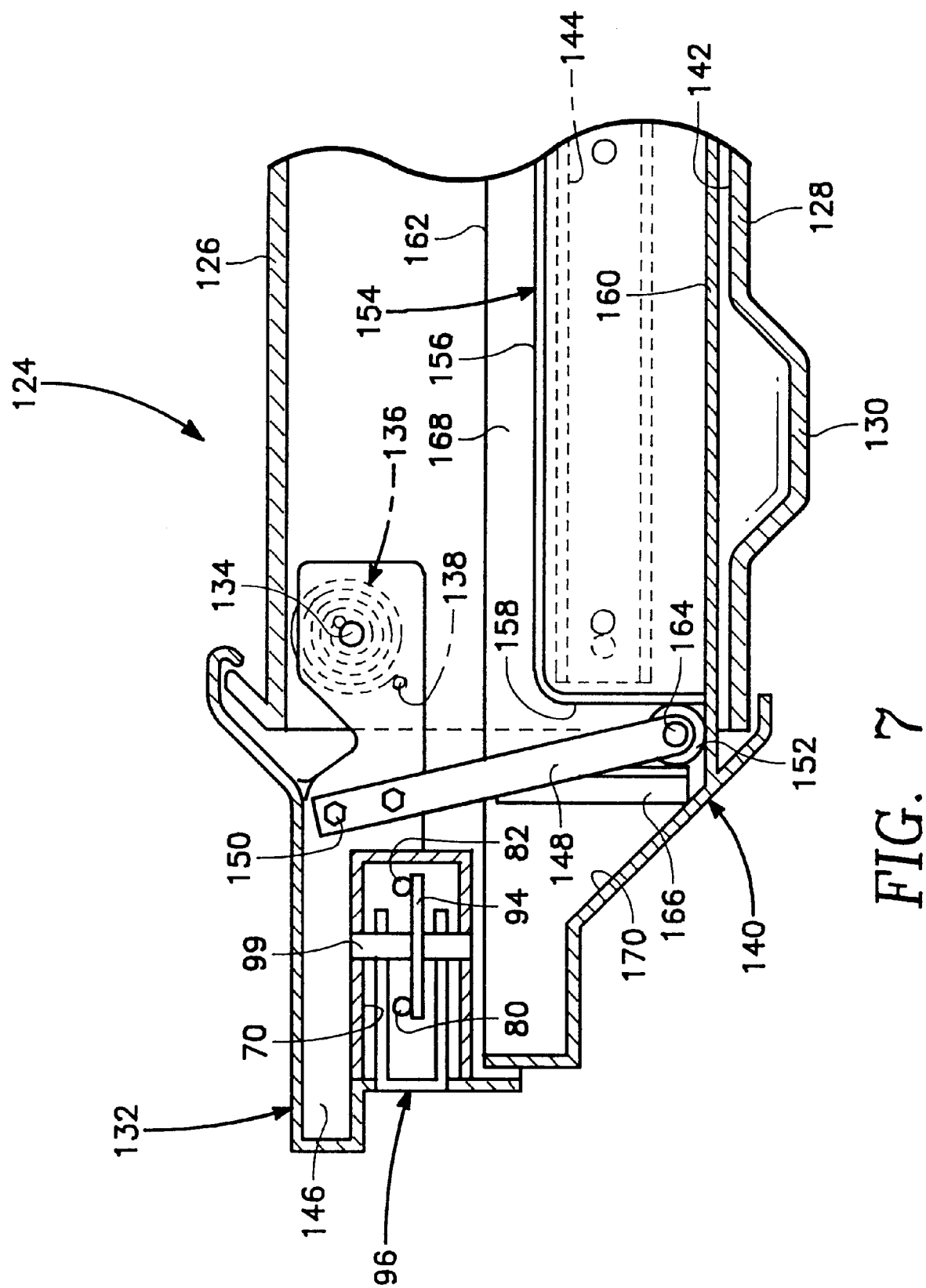
FIG. 7 is a transverse cross-sectional view similar to FIG. 5 which shows a modification of this invention where the door of the storage device is connected to the drawer by use of a low frictional roller which engages with a guide track.
Figure 8:
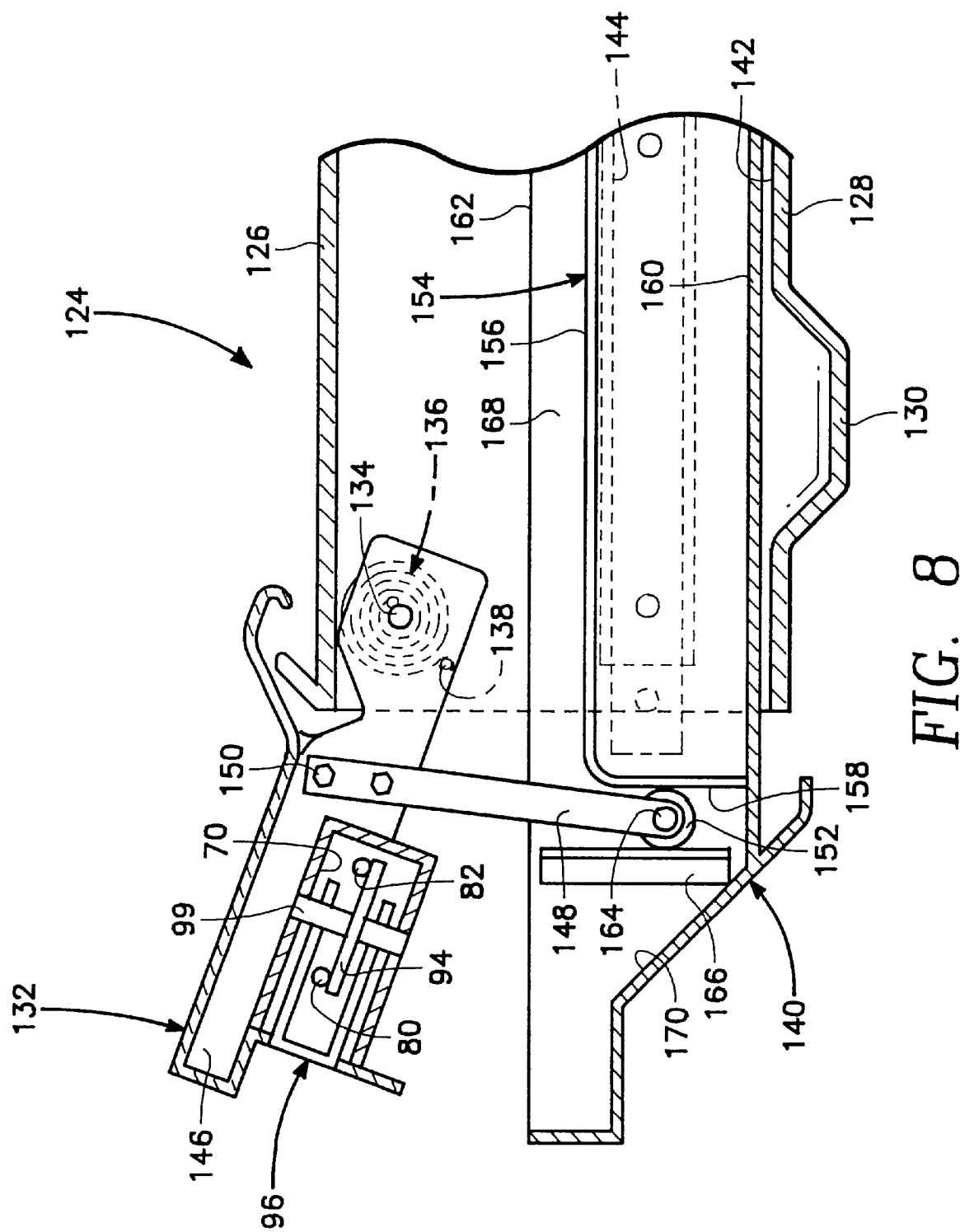
FIG. 8 is a view similar to FIG. 7 but where the modification of this invention is in the position with the door partially open.
Figure 9:
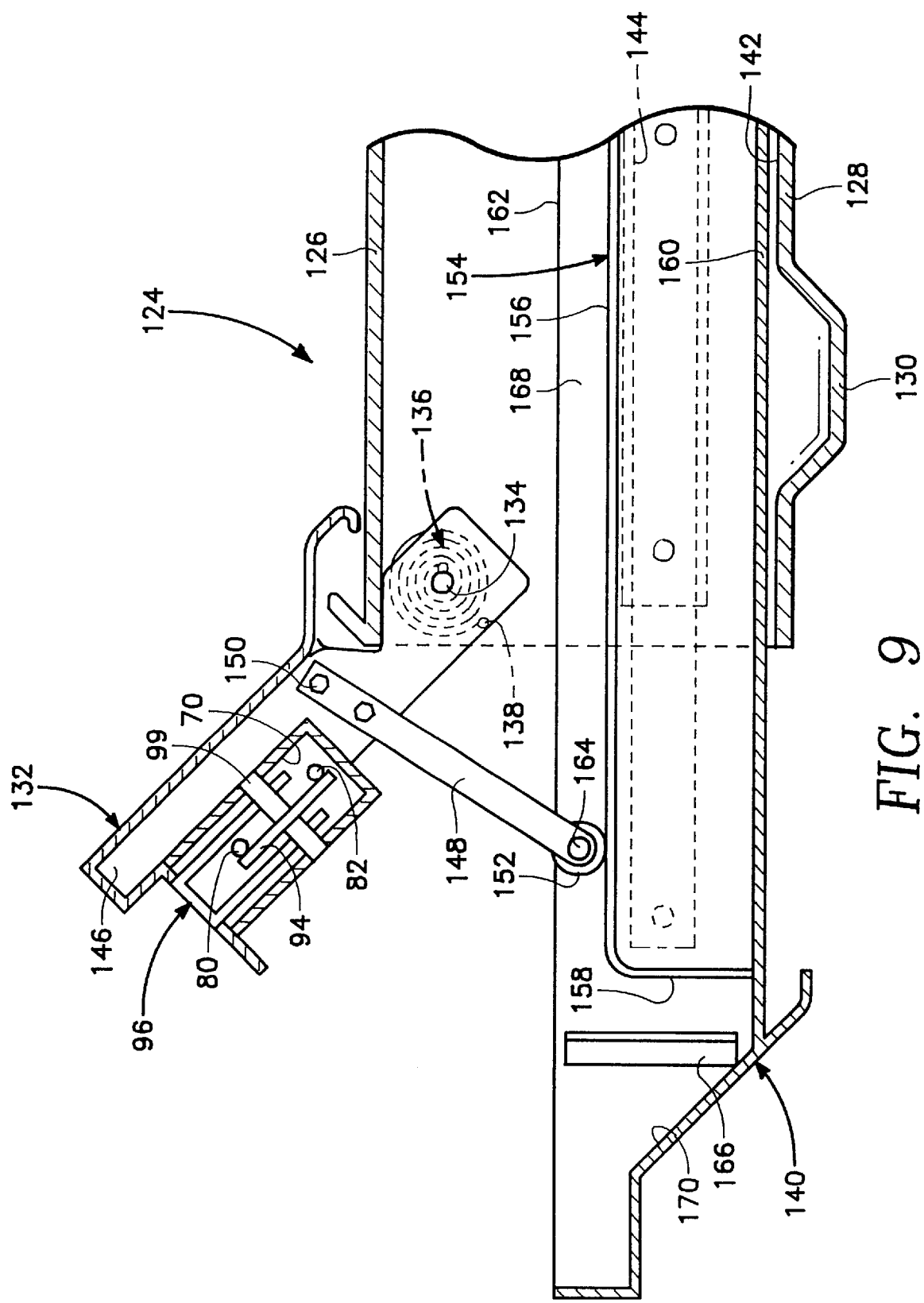
FIG. 9 is a transverse cross-sectional view similar to FIG. 8 where the door is in the open position and the drawer is partially extended.

Referring particularly to FIG. 7–9 of the drawings, there is shown a modified form of running board storage compartment 124 of this invention. This modified form of storage compartment 124 includes a housing 126 which includes a bottom 128. The bottom 128 includes a longitudinal strengthening rib 130. A door 132, which is basically identical to the door 56, is pivotally connected to the housing 126 by means of a pair of pivot pins with only pivot pin 134 being shown. Surrounding each of the pivot pins 134 is a spring with only the spring 136 being shown. The free end of the spring 136 connects to a pin 138 which is fixedly mounted on the housing 126. The result is there is a constant bias by the spring 136 applied to the door 132 tending to locate the door 132 in a constantly open position, shown in FIG. 9. However, the strength of the springs, such as spring 136, is normally not sufficient to force the door 132 to the open position as the door 132 does require the addition of some manual opening force.

The drawer 140 is basically identical to the drawer 52. Drawer 140 is slidingly mounted within interior compartment 142 of the housing 126. Mounted on the sidewalls of the housing 122 are drawer slide assemblies 144, which are deemed to be conventional. These drawer slide assemblies 144 permit the drawer 140 to be moved from the retracted position, shown in FIG. 7, to the extended position which is shown in FIG. 9. However, the extended position in FIG. 9 is not the fully extended position, but only a partially extended position.

The door 132 includes a pair of sidewalls with only sidewall 146 being shown. Sidewall 146 is basically similar to sidewall 88. Attached to each sidewall, with only the attachment being shown to sidewall 146, is an arm 148. Each arm 148 is secured to its respective sidewall by means of bolts 150. Mounted on the end of the arm 148 is a roller 152. The roller 152 is supported by a bolt 164 low frictionally by a bearing (not shown) relative to the arm 148 so that the roller 152 is freely rotatable relative to the arm 148. This roller 152 is to provide a structure that facilitates sliding movement within a track 154. The track 154 is actually comprised of two separate sections with each track 154 to connect with a roller with only roller 152 being shown. Each track 154 includes a horizontal section 156 that is to extend substantially the entire depth of the drawer 140 and terminates directly adjacent the back wall of the drawer 140, which is not shown. The track 154 also includes a vertical section 158. The vertical section 158 extends substantially at a right angle relative to the horizontal section 156. The vertical section 158 extends from the bottom 160 of the drawer 140 to directly adjacent the top edge 162 of the drawer 140.

When the modified form of storage compartment 124 is in the closed position, which is shown in FIG. 7, the roller 152 is combined within the vertical section 158 and is located between the vertical section 158 and a front stop plate 166. This front stop plate 166 is fixedly mounted onto the sidewall 168 of the drawer 140. Again, it is to be understood that there will be actually two in number of the stop plates 166, each one mounted on a sidewall of the drawer 140. In this closed position, shown in FIG. 7, the roller 152, because of its confinement between the front stop plate 166 and the vertical section 158, prevents any movement of the drawer 140 relative to the housing 126.

Referring particularly to FIG. 8, when the door 132 is in the process of being opened and being moved to the open position, the roller 152 is moved upward within the vertical section 158. It is to be noted that the arm 148 has moved clockwise about fifteen to twenty degrees, and because of the confinement of the roller 152 between the front stop plate 166 and the vertical section 158, the drawer 140 is moved partially to the extended position. This ejecting of the drawer 140 is to facilitate its manual grasping and manual movement to the extended position, which is not shown in the drawings, with only a partial extended position being shown in FIG. 9. In the extended position, each of the rollers 152 will be located at the back wall of the drawer 140, which is not shown.

When the door 132 is finally pivoted to its open position, as shown in FIG. 9, the roller 152 is capable of resting on the horizontal section 156 of the guide track 154. The drawer 140 is now capable of being grasped and manually moved to the extended position permitting unobstructed entry into the interior compartment 170 of the drawer 140 which is now moved outwardly so as to be unobstructed by the drawer 132. The roller 152, in the open position, provides a positive support for the door 132 when the door 132 is open and prohibits the door 132 from closing unless the drawer 140 is moved to the retracted position. This means that the door 132 will be maintained free and spaced from the interior compartment 170 as long as the drawer 140 is in the extended position. When viewing of the drawer from the extended position to the retracted position, when almost at the retracted position, the roller 152 will contact the front stop plate 166. Further movement of the drawer toward the retracted position will cause the door 140 to begin to be pivoted toward the closed position.

The present invention may be embodied in other specific forms without departing from the essential attributes thereof. Reference should be made to the appending claims rather than the foregoing specification as indicating the scope of the invention.

What is claimed is:

1. In combination with a land vehicle having a body and a set of wheels located at each side of said body, an access door mounted within said body located between each said set of wheels, a running board mounted on said body and located between said set of wheels and located beneath said access door, said running board being adapted to function as a step for a human when entering and exiting said body, said running board comprising:

a housing fixed to said body, a drawer having an inside compartment, said drawer being movably mounted on said housing between a retracted position and an extended position, when said drawer is in said extended position access is obtained into said inside compartment;

a door mounted on said housing, said door being movable between an open position and a closed position, said open position permits access to said inside compartment, said closed position positions said door to block movement of said drawer and enclosing said internal compartment, said door when in said closed position functioning as a step for a human when entering and exiting said vehicle;

an arm mounted on said door, said arm having a free end, a means for sliding mounted on said free end; and a guide track mounted on said drawer, said means for sliding connecting with said track, whereby as said door is moved from said closed position to said open position said means for sliding is moved on said guide track causing said drawer to be initially moved from said retracted position toward said extended position, whereby when said door is in said closed position said sliding means and said guide track function as a lock preventing movement of said drawer relative to said housing, whereby when said door is in said open position said sliding means and said guide track function as a support for said door preventing of movement of said door from said open position to said closed position when said drawer is in said extended position.

2. The combination as defined in claim 1 wherein:

a means for locking mounted on said housing, said means for locking to engage with said door to fixedly secure said door in said closed position preventing movement of said drawer to said extended position, upon the unlocking of said means for locking said drawer to be movable to said extended position.

3. The combination as defined in claim 1 wherein:

said door being hingedly movable between said open position and said closed position.

4. The combination as defined in claim 1 wherein:

said drawer being slidingly movable between said retracted position and said extended position.

5. The combination as defined in claim 1 wherein:

said drawer having a first front face, said door having a second front face, said first front face and said second front face cooperating to form a front surface of said running board when said drawer is in said retracted position and said door is in said closed position.

6. The combination as defined in claim 1 wherein:

said door having a downwardly depending flange which is positioned directly adjacent said drawer when said door is in said closed position preventing movement of said drawer to the extended position.

7. The combination as defined in claim 1 wherein:

said means for sliding comprises a roller which is low frictionally movably attached to said arm.

8. The combination as defined in claim 1 wherein:

said drawer having a height and a depth; and said guide track having a horizontal section and a vertical section, said vertical section being aligned with said height, said horizontal section being aligned with the depth of the drawer.

9. The combination as defined in claim 1 wherein:

said guide track including a front stop plate mounted on said drawer, said front stop plate to limit the movement of said means for sliding in the direction toward said retracted position when in said retracted position.

10. A running board storage device adapted to be mounted on a vehicle comprising:

a housing fixed to said body, a drawer having an inside compartment, said drawer being movably mounted on said housing between a retracted position and an extended position, when said drawer is in said extended position access is obtained into said inside compartment;

a housing fixed to said body, a drawer having an inside compartment, said drawer being movably mounted on said housing between a retracted position and an extended position, when said drawer is in said extended position access is obtained into said inside compartment;

a door mounted on said housing, said door being movable between an open position and a closed position, said open position permits access to said inside compartment, said closed position positions said door to block movement of said drawer and enclosing said internal compartment, said door when in said closed position adapted to function as a step for a human when entering and exiting the vehicle;

an arm mounted on said door, said arm having a free end, a means for sliding mounted on said free end; and a guide track mounted on said drawer, said means for sliding connecting with said track, whereby as said door is moved from said closed position to said open position said means for sliding is moved on said guide track causing said drawer to be initially moved from said retracted position toward said extended position, whereby when said drawer is in said closed position said sliding means and said guide track function as a lock preventing movement of said drawer relative to said housing, whereby when said door is in said open position said sliding means and said guide track function as a support for said door preventing of movement of said door from said open position to said closed position when said drawer is in said extended position.

11. The running board storage device as defined in claim 10 wherein:

a means for locking mounted on said housing, said means for locking to engage with said door to fixedly secure said door in said closed position preventing movement of said drawer to said extended position, upon the unlocking of said means for locking said drawer to be movable to said extended position.

12. The running board storage device as defined in claim 10 wherein:

said door being hingedly movable between said open position and said closed position.

13. The running board storage device as defined in claim 10 wherein:

said drawer being slidingly movable between said retracted position and said extended position.

14. The running board storage device as defined in claim 10 wherein:

said drawer having a first front face, said door having a second front face, said first front face and said second front face cooperating to form a front surface of said running board when said drawer is in said retracted position and said door is in said closed position.

15. The running board storage device as defined in claim 10 wherein:

said door having a downwardly depending flange which is positioned directly adjacent said drawer when said door is in said closed position preventing movement of said drawer to the extended position.

16. The running board storage device as defined in claim 10 wherein:

said means for sliding comprises a roller which is low frictionally movably attached to said arm.

17. The running board storage device as defined in claim 10 wherein:

said drawer having a height and a depth; and said guide track having a horizontal section and a vertical section, said vertical section being aligned with said height, said horizontal section being aligned with the depth of the drawer.

18. The running board storage device as defined in claim 10 wherein:

said door being constantly biased by a biasing means towards an open position.

19. The running board storage device as defined in claim 10 wherein:

said guide track including a front stop plate mounted on said drawer, said front stop plate to limit the movement of said means for sliding in the direction toward said retracted position when in said retracted position.

* * * * *